United States Patent Office 3,072,463
Patented Jan. 8, 1963

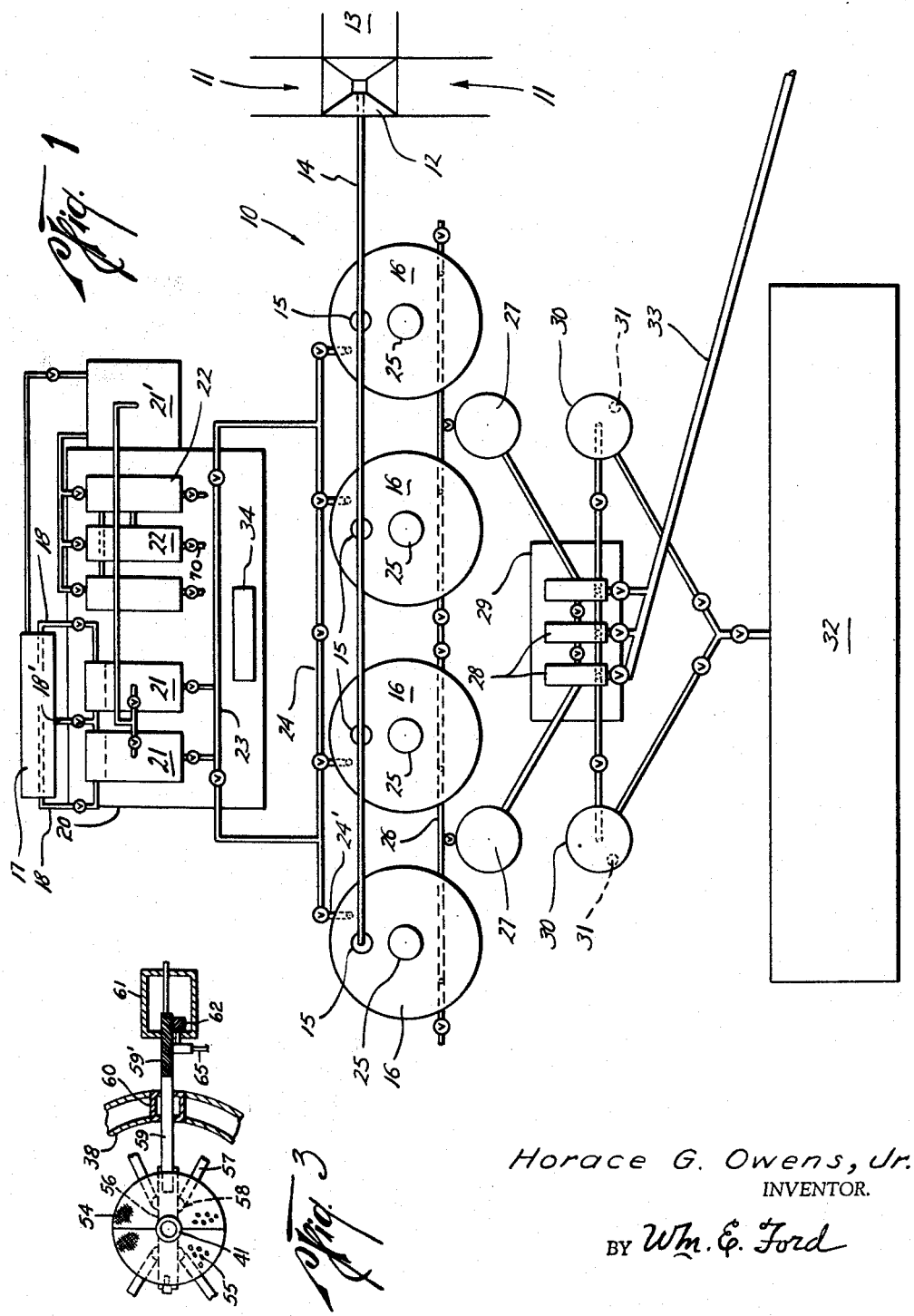

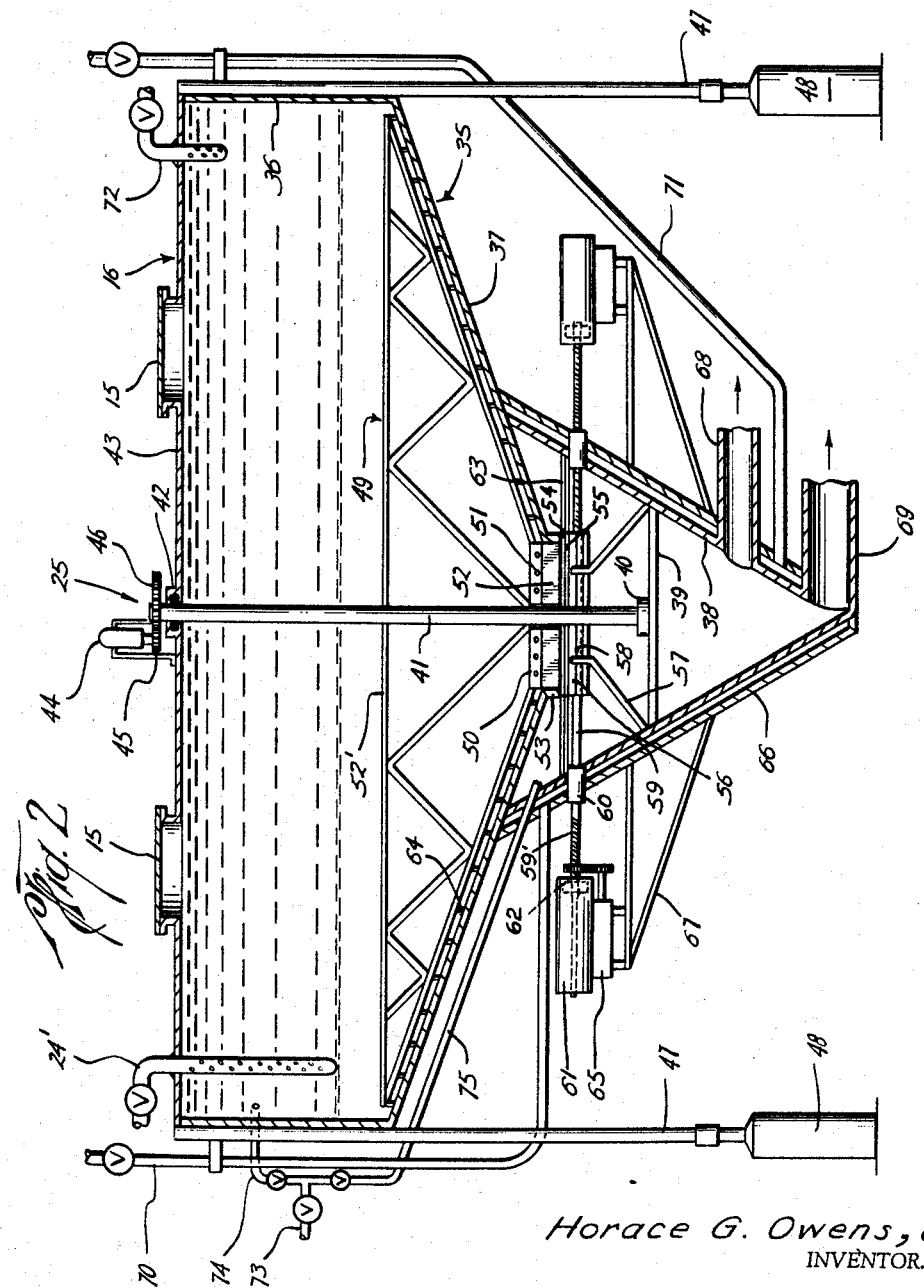

3,072,463
SEPARATOR FOR SURFACE SULPHUR
OPERATIONS
Horace G. Owens, Jr., 2630 1st St., Rosenberg, Tex.
Filed Oct. 14, 1957, Ser. No. 689,982
7 Claims. (Cl. 23—280)

This invention relates to a surface sulphur plant and method of separation whereby a sulphur bearing ore dug at or proximate the surface is processed in surface equipment without first being brought into melting contact with pressurized, heated water in subterranean mining, as by the Frasch process, and the invention particularly relates to equipment and apparatus for processing such sulphur bearing ores at the surface, whereby a greater recovery and purer yield of sulphur can be obtained far less expensively than by Frasch process mining.

It is consequently a primary object of this invention to provide process and apparatus for inexpensively and efficiently separating sulphur from sulphur bearing ore at the surface.

It is a further object of this invention to provide a process of this kind which obtains a greater recovery and purer yield than can be obtained by Frasch processes and the other related processes employed in subterranean mining with pressurized, heated water.

It is also an object of this invention to provide plant equipment and apparatus of this type requiring a minimum of installations and bulk apparatus while at the same time achieving a maximum of recovery and a purer yield of sulphur than can be achieved by subterranean sulphur mining processes.

Other and further objects will be apparent when the specification herein is considered in connection with the drawings in which:

FIG. 1 is a diagrammatic plan view of a sulphur plant for employing the process of this invention in separating sulphur from sulphur bearing ore at the surface;

FIG. 2 is a sectional elevation, partially diagrammatic, showing a sulphur separator employed in the plant shown in FIG. 1, such a separator being of the type best adapted to carry out the processes of this invention; and FIG. 3 is a sectional plan view taken along line 3—3 of FIG. 2.

Referring first to FIG. 1, the general arrangement of a plant 10 is shown in which sulphur bearing ore is dumped from trucks to slide down ramps 11, diagrammatically indicated, into a hopper 12. Also a larger ramp 13 is similarly indicated down which sulphur bearing ore dumped thereon may be pushed, as by a bulldozer, into the hopper 12.

From the hopper 12 the ore falls upon a conventional conveyor belt 14 which traverses manholes 15 in separators 16 to be described in detail, as shown in FIG. 2. Conventional means, not shown, are provided, for derailing the ore, or part thereof at each manhole 15, or for selectively derailing it in various quantities at various manholes, or such derailment means may be operated sequentially, so that the separators are filled successively from nearest to farthest from the hopper 12.

The ore introduced into the separators 16 has water mixed with it therein. Such water in raw state is supplied to a water tank 17, and is fed therefrom to a water treatment room 21' where the process of precipitating impurities is carried out. From the water treatment room 21' the treated water is delivered to heaters 19 where it is subjected to intense heat, as by a gas fuel. The gases of combustion from such fuel are conducted through ducts 18 to pre-heat the raw feed water in the raw water tank 17, and thereafter such gases may be vented to a stack or returned through a duct 18' to the heaters for further circulation. Also, the treated water from the treatment room 21' may be used in part as boiler feed water in a battery of boilers 22, and the steam generated from these boilers employed in the plant for purposes as will be hereinbelow described.

A base 20, as a concrete slab, is shown provided on which the boilers 22 and heaters 21 are mounted. A conventional thermostat control panel 34 is also supported upon such slab and various leads from such panel extend to control the temperatures in the various boilers 22 and heaters 21.

The super-heated water from the heaters 21, in substantially purified state, may pass from the header 23 to a supply header 24 positioned to supply the super-heated water to each separator 16. An agitator assembly 25, generally indicated by a circle at the center of each separator in FIG. 1, and to be described in detail, as shown in FIG. 2, stirs and mixes the super-heated water and the sulphur bearing ore in the separators, as will be hereinbelow described, and the sulphur is separated out from the ore, water, and other matter, as slag, and flows from each separator to a sulphur discharge header 26, from whence it flows for treatment into the sulphur treatment tanks 27, such tanks being steam jacketed to maintain the sulphur fluid, and being adapted to be cleaned or flushed by the gravel method.

From the tanks 27 the sulphur passes to a battery of filters 28 mounted on a base 29, and after being filtered in such filters 28 it passes to receiving tanks 30 having agitators 31 therein equipped with templers, and at this point the sulphur should be in the status of 99.5% pure sulphur. In the receiving tanks, which may be steam jacketed, the sulphur is kept fluid by the heat thereof, and by agitation, to be controlled in exits therefrom to pass on to a vat 32 to be conventionally disposed in such vat to harden therein preparatory to shipment to point of use. A railroad spur designated by the reference numeral 33 is provided over which railroad flat cars may pass to be positioned to receive therein the slag which has been separated from the sulphur by the filters 28.

Referring in detail to FIG. 2, a separator 16 is shown comprising a vessel 35 consisting of an upper cylindrical portion 36, a central, inverted, frusto-conical portion 37 extending downwardly from the bottom of the cylindrical portion 36, and an inverted conical bottom portion 38 extending downwardly from the central portion 37 from a jointure therewith intermediate the top and the bottom of such central portion. The vessel 35 is supported by upright members, as pipes or stanchions 47, which arise from concrete columns 48, and are connected to the upper, cylindrical portion 36 of the vessel 35.

A cross-member 39 extending across the bottom portion 38, supports a lower journal bearing 40 for the lower end of a shaft 41 which extends upwardly therefrom axially of said vessel and extends through an upper journal bearing 42 in the top 43 of the vessel. The drive assembly 25 for such shaft comprises a motor 44 mounted on the top 43, such motor having a pinion 45 on the shaft thereof to mesh with a gear 46 on the shaft 41, whereby the gear 46 rotates the shaft 41.

The shaft 41 has installed thereon an impeller 49 including a plate 50 having openings 51 therein and also including an inverted truss structure 52' with the lower members thereof spaced from the inner surface of the bottom of the central portion 37, and extending parallel thereto. Protective neoprene vane or plates 52 are provided and connected to the plate 50 in two sections to extend diametrically on opposite sides of shaft 41, such vanes being fastened to the under surface of the plate 50 and positioned to scrape over the perforate circular plate or flange 53 which surrounds the shaft 41 and is fastened thereto to support the mesh filter screen 54 therebelow. Vanes 64 connected to the under side of the impeller trusses 52' are shaped and installed to direct matter in contact therewith downwardly.

The neoprene plates 52 are constructed to extend across the circular flange 53 at the bottom of the central portion 37 of the vessel 35, and are so very slightly spaced from a complementally arranged pair of semi-circular filter mesh screen discs 54 of material such as 24 by 110 stainless steel mesh which complementally fit centrally, with slight clearance around the shaft 41. These mesh discs 54 are connected to and supported upon perforated plate discs 55 of the same sized area as the mesh discs 54, and the perforations in the plate are of predetermined size and space, such as ½" diameter holes spaced 1" apart.

The plate discs 55 are connected to supports 56 which are in turn supported from opposite sides of the conical portion 38 by half-sleeve brackets 57 having outrigger tubes 58 extending transversely therefrom. Each support 56 is connected to the inner end of a shaft 59 having near the other end thereof a worm section 59'. Such shaft extends through a cylinder 60 passing through the conical portion 38 and the steam jacket 66 of the shell, such cylinder 60 being welded to these elements to prevent leakage, and the ends of the cylinder 60 providing journals for the shaft 59. The worm section 59' of the shaft 59 extends through the inner end of a cylinder 61 and the outer end of the shaft 59 beyond the worm section 59' is journalled in the outer end of the cylinder 61. The worm section 59' within the cylinder 61 meshes with a worm gear 62 which has its shaft journalled in the inner end of the cylinder 61 with the outer end of the worm gear shaft having means thereon, as a pulley, which constitutes part of the drive means 65 indicated in FIG. 2. Thus when the drive means 65 is actuated to rotate the worm gear 62 in one direction, the worm shaft 59 is moved outwardly and this outward movement carries with it the support 56, the plate disc 55 connected thereto, and the mesh disc 54 carried by the plate disc 55. To assure the leveled outward passage of the discs 55 and 54 the outrigger plate 58 mentioned hereinabove has been provided on which the disc 55 slides guidedly, and guide angles 63, supported within the conical portion 38 from the shell thereof, are provided at equally spaced distances on either side of the worm shaft to guide the side edges of the discs 54 and 55 and the outer part of the disc 55. The drive means in FIG. 1 being indicated by the reference numeral 65, and is a reversible motor which can drive the worm or transmission means 62 either in direction to advance the discs 54, 55 inwardly to the position shown in FIG. 2 or to retract them outwardly to clear the space below the flange 53.

The bottom portion 38 has a steam jacket 66 therearound, and support brackets or braces 67 are provided to extend from the outer surface of the steam jacket 66 to support the drive means 65 for the transmission means 62. A drain 68 for the molten sulphur extends from the interior of the bottom portion 38 through the steam jacket 66 as shown, and therebelow a discharge 69 is provided for the slag which may settle out of the sulphur.

The drive means 44 for the shaft 41 may be a turbine driven motor to which steam from the boilers 22 shown in FIG. 1 is supplied to drive the turbine. Also these boilers 22 supply the steam to the steam line 70, shown in FIG. 2, which supplies steam to the steam jacket 66. A line 71 is shown extending from the lower part of the steam jacket 66 to provide a hot water outlet therefrom.

The inlet of superheated water from the header 24 into the vessel 35 is shown as a perforated pipe in FIG. 2, so that such water may thoroughly percolate through the sulphur bearing ore with which the upper and central portions of the vessel are filled. An outlet pipe 72 from the vessel is also provided to extend upwardly through the top, the mine water from the ore in the vessel passing out therethrough at certain pressures built up in the vessel, to flow to another vessel, or to be disposed of as waste water. A blow off, as a compressed air line 73 is provided, branching to discharge through the line 74 into the upper portion 36 of the vessel, and to discharge through line 75 downwardly into the top of the conical bottom part 38 to blow out the sulphur and other deposited matter therefrom.

In operation the sulphur bearing ore is delivered to the ramps 11 and/or 13 to slide therefrom into the hopper 12 from which it drops onto the conveyor belt 14 to be delivered to the separator 16. Conventional deflecting vanes, not shown, are provided above each manhole 15 to deflect the ore selectively into the first separator and then successively into the separators outwardly therefrom. Alternately such deflecting vanes may be so positioned to deflect some sulphur into each separator, the structure and method of setting deflectors in this manner being conventional and well known. The process of treatment of the sulphur bearing ore in each separator after it is filled is substantially identical and the operation thereof will be hereinbelow described with reference to one separator.

When the separator is filled with the sulphur bearing ore, superheated water is admitted thereinto through the line 24' to percolate through the ore and at the same time the turbine 44 is started to drive the shaft 41 into an impeller connected thereto to stir up the ore and facilitate its mixing with the superheated water, with the consequence that the sulphur melts from the ore and congregates in the lower part of the central portion 37 of the vessel 35 and stands within the flange 53, and to an extent thereabove, as it awaits passage through the mesh discs 54 and the perforated plate discs 55 therebelow. The holes 51 in the plate 52 admit passage of the molten sulphur therethrough as the impeller 49 is rotated and in this way the sulphur is mixed toward becoming a homogeneous mass. Below the plate 50 the neoprene plate 52 passes over the mesh 54 and works the sulphur therethrough to pass as molten pellets through the perforated discs 55 to fall into the bottom portion 38 of the vessel 35.

The steam jacket 66 around the bottom portion 38 of the vessel 35 maintains the interior thereof at such a high temperature that the pelletized sulphur is converted into a molten mass of flowable sulphur and any slag which has passed through with the sulphur pellets is precipitated below this molten mass of sulphur to stand in the very bottom of the portion 38. A drain 68 is shown which has a conventional valve arrangement, not shown, through which the flowable sulphur mass may be drawn off through the sulphur discharge header 26 into the sulphur treatment tanks 27, as shown in FIG. 2. The slag drain 69 also has a suitable valve arrangement which may be opened for removal of the slag from the bottom portion 38 of the vessel.

After treatment the sulphur is filtered, as hereinabove described, and then maintained in agitation in receiving tanks 30 until it is passed to the vat 32 for hardening. The filtered slag in turn is transported away on flat cars over the railroad spur 33.

The feature of portability is a feature inherent in a sulphur operated plant of this type since the whole plant may be mounted on only a few supporting bases. For instances, the heaters, boilers and raw water tank may all be mounted on a single base, as the base 20 and the separators may be mounted each on four support columns 48. The filters may be mounted on a single base 29, the treatment tanks and receiving tanks may be mounted on small individual supports, not shown, and the vat 32 may be mounted on a single base. Also a portable ramp and hopper support structure is all that is required for the reception of the sulphur bearing ore while the conveyor 14 therefrom may be merely supported by the separators 16. There is thus provided a plant which may be moved from one sulphur bearing ore location to another location as desired while the advance preparation for moving requires a minimum of structural work, such preparation being restricted to no more than the work entailed in providing a minimum of concrete bases and supports.

The manholes 15 being closable, and the rate of entry of superheated water through the pipe 24' being subject to regulation, a pressure differential can be built up in favor of the upper portions of the vessel 35 over the lower portion thereof above the screens and discs, with the consequence that this excess of pressure abets the impeller in urging the molten sulphur, in pelletized form, through the mesh and perforated discs.

As a feature of the invention, the mesh and perforated discs may be moved outward automatically to let the ore and slag from thereabove fall downwardly into the lower portion of the vessel to be evacuated through the slag drain 69. Additionally this evacuation may be abetted and completed by the use of compressed air admitted through the blow-down line 74. Also compressed air may be admitted through the blow-down line 75 to further abet this evacuation through the bottom portion 38. Furthermore, such blow-down line 75 may be employed alone when the bottom portion 38 is to be evacuated and cleansed of sulphur deposit, slag, and other matter accumulated during normal operation not attendant upon evacuation of the ore from thereabove.

The invention is not limited to the structures and methods hereinabove described but other structures and methods are considered as such may fall within the broad spirit of the invention and within the broad scope of interpretation claimed and merited by the appended claims.

What is claimed is:

1. A separator including a vessel having a sulphur bearing ore receiving upper portion having a bottom opening and a lower portion with an upper part to communicate with said bottom opening, a vertically, axially extending, rotatable shaft in said vessel extending downwardly through said upper portion and supported in said lower portion, an impeller connected to said shaft within said upper portion and extending thereacross, a screen extending horizontally across said lower portion and of mesh to let melted sulphur pass therethrough, said screen being split to extend complementally around said shaft, a superheated water conduit to introduce superheated water through the top of said vessel to percolate downwardly through the ore, a discharge outlet from said upper portion spaced oppositely therein from said superheated water conduit to let the percolated water escape from the top of said vessel, said impeller moving the ore over said screen so that the sulphur softened by the water may pass through said screen to settle from the water in said lower part of said lower portion, a steam jacket around said lower portion to maintain the sulphur melted into a flowable mass, an upper conduit passing from said lower portion sealably through said steam jacket to drain the flowable mass from said lower portion, screen section retraction and extension means extending sealably through said steam jacket for connection to the opposed sections of said split screen and protected from steam contact, opposed motor means supported outwardly of said steam jacket and connected to said retraction and extension means to move said split screen section connecting means outwardly in opposite directions to let the sulphur depleted ore fall downwardly from said upper portion, and a lower conduit passing from said lower portion sealably through said steam jacket below said upper conduit to give access for the removal of the depleted ore from said lower portion.

2. A separator as claimed in claim 1 in which a blow-down means is provided in said upper portion for its evacuation and cleaning and a corresponding blow-down means is provided to pass sealably through said steam jacket for evacuating and cleaning said lower portion.

3. A separator comprising a vessel having an upper portion to receive a sulphur bearing ore and a lower portion with which the upper portion communicates through a bottom opening provided centrally therein, a vessel supported, axially extending, rotatable shaft extending vertically through said upper portion and having an impeller thereon connected to said shaft within said upper portion and extending thereacross, a screen below said bottom opening split at said shaft and extending as a closure across said bottom opening and around said shaft and of mesh to let molten sulphur pass therethrough, a superheated water supply inlet connected to introduce superheated water into the top of said vessel to percolate downwardly through the ore, a discharge outlet from the top of said upper portion and spaced from said superheated water supply inlet, said impeller rotation moving the water softened sulphur over said screen to be worked therethrough under pressure as said superheated water tends to be admitted through said supply inlet faster than evacuation may take place through said discharge outlet, said sulphur thus passed through said screen settling from said water into the lower part of said lower portion, a jacket around said lower portion to apply the heat content supplied thereinto to heat the lower portion sulphur contents into a flowable mass, drain means passing from said lower portion sealably through said jacket whereby the contents of said lower portion may be withdrawn therefrom, and vessel mounted means connected for extension and retraction of said screen sections in the horizontal plane from under said bottom opening whereby upon screen retraction the depleted ore may fall into said lower portion to be evacuated therefrom.

4. A separator as claimed in claim 3 in which said drain means includes an upper discharge extending sealably from said lower portion through said jacket to permit the molten sulphur mass to be drained from said lower portion, and a lower discharge extending sealably from said lower portion through said jacket to permit the depleted ore to be drained from said lower portion.

5. A separator as claimed in claim 3 in which said vessel includes a top cover having said rotatable shaft mounted thereupon for rotation therebelow and through which said supply inlet extends into said upper portion.

6. A separator as claimed in claim 3 in which a blow-down means is provided in said upper portion for its evacuation and cleaning and in which a corresponding blow-down means is provided to pass sealably through said jacket for evacuating and cleaning said lower portion.

7. A plant for separating sulphur from a sulphur bearing ore at the surface of the earth said plant comprising separator means constructed to include a vessel having an upper portion to receive a sulphur bearing ore and a lower portion with which the upper portion communicates through a bottom opening provided centrally therein, a vessel supported, axially extending, rotated shaft extending vertically through said upper portion and having an impeller thereon connected to said shaft within said upper portion and extending thereacross, a screen below said bottom opening split at said shaft and extending as a closure across said bottom opening and around said shaft and of mesh to let molten sulphur pass therethrough, a superheated water supply inlet connected to introduce superheated water into the top of said vessel to percolate downwardly through the ore, a discharge outlet from the top of said upper portion and spaced from said superheated water supply inlet, said impeller rotation moving the water softened sulphur over said screen to be worked therethrough under pressure as said superheated water tends to be admitted through said supply inlet faster than evacuation may take place through said discharge outlet, said sulphur thus passed through said screen settling from said water into the lower part of said lower portion, a jacket around said lower portion to apply the heat content supplied thereinto to heat the lower portion sulphur contents into a flowable mass, drain means passing from said lower portion sealably through said jacket whereby the contents of said lower portion may be withdrawn therefrom, and vessel mounted means connected for extension and retraction of said screen sections in the horizontal plane from over said bottom opening whereby upon screen retraction the depleted ore may fall into said lower portion to be evacuated therefrom, said plant also including conveyor means to introduce the sulphur bearing ore into said upper portion, a raw water receiving means, water treatment means to treat the raw water, heater and superheater means to respectively and successively heat and superheat the treated water, means to deliver the superheated water to said supply inlet, at least one steam boiler connected to receive treated water and convert it into steam, blow-down means connected to deliver steam into said upper portion and into said lower portion, steam delivery means connected to deliver steam to said blow-down means and to said jacket, compressor means connected to deliver compressed air to said blow-down means to blow said steam in blowing down said upper portion and said lower portion, sulphur treatment tank means, conduit means to deliver the flowable molten sulphur from said drain means to said treatment tank means, filter means connected to receive the treated sulphur from said treatment tank means, receiving tank means connected to receive the filtered sulphur for settling, vat means connected to receive the settled sulphur from the receiving tank for hardening, and means to carry away the slag filtered by said filter means from the treated sulphur.

References Cited in the file of this patent

UNITED STATES PATENTS

| | | |
|---|---|---|
| 298,734 | Dickert | May 20, 1884 |
| 1,508,355 | Thornton | Sept. 9, 1924 |
| 1,800,605 | Crowley et al. | Apr. 14, 1931 |
| 2,257,362 | Zitkowski | Sept. 30, 1941 |
| 2,292,716 | Pyzel | Aug. 11, 1942 |
| 2,731,332 | Ackert et al. | Jan. 17, 1956 |

FOREIGN PATENTS

| | | |
|---|---|---|
| 508,149 | Germany | Sept. 24, 1930 |